(12) United States Patent
Turina

(10) Patent No.: US 8,089,885 B2
(45) Date of Patent: Jan. 3, 2012

(54) TECHNIQUE FOR PROVIDING SELECTIVE ACCESS TO NETWORK NODE

(75) Inventor: Klaus Turina, Backnang (DE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 800 days.

(21) Appl. No.: 11/575,124

(22) PCT Filed: Sep. 13, 2004

(86) PCT No.: PCT/EP2004/010226
§ 371 (c)(1),
(2), (4) Date: Jun. 18, 2008

(87) PCT Pub. No.: WO2006/029640
PCT Pub. Date: Mar. 23, 2006

(65) Prior Publication Data
US 2008/0260109 A1 Oct. 23, 2008

(51) Int. Cl.
*H04L 1/00* (2006.01)

(52) U.S. Cl. ............ 370/241; 370/247; 370/251; 379/9; 379/10.01; 379/12; 379/15.05; 379/19; 379/26.01; 379/27.01; 379/29.01

(58) Field of Classification Search ............... 370/13, 370/17, 247, 251, 241; 379/26.01, 9, 10.01, 379/12, 15.05, 19, 27.01, 29.01
See application file for complete search history.

(56) References Cited

U.S. PATENT DOCUMENTS

| | | | |
|---|---|---|---|
| 5,359,646 A * | 10/1994 | Johnson et al. | 379/27.02 |
| 6,493,425 B1 * | 12/2002 | Abe | 379/1.01 |
| 6,956,832 B1 * | 10/2005 | Muhonen et al. | 370/310 |
| 2004/0170256 A1 | 9/2004 | Wright et al. | |

FOREIGN PATENT DOCUMENTS

| WO | WO 96/32821 A1 | 10/1996 |
|---|---|---|
| WO | WO 02/51181 A1 | 6/2002 |

* cited by examiner

*Primary Examiner* — Melur Ramakrishnaiah
*Assistant Examiner* — Yosef K Laekemariam

(57) ABSTRACT

A technique is disclosed for selectively providing access to a network node for testing and verification associated with a testing classification and requests are received from a network component to initiate a call via the net-work node. If it is determined that with the testing classification, service is provided via the network node.

29 Claims, 2 Drawing Sheets

TECHNIQUE FOR PROVIDING SELECTIVE ACCESS TO NETWORK NODE

FIELD OF THE INVENTION

The invention relates to the communication of data. More specifically, the invention relates to a technique for providing selective access to a network node.

BACKGROUND OF THE INVENTION

Layered network architectures having open interfaces are being increasingly adopted. Such architectures separate call control and connectivity into different layers to provide enhanced flexibility. With reference to FIG. 1, a network control layer includes a Mobile Switching Center (MSC) server 110 which controls circuit-mode services. In a connectivity layer 140, Media Gateways (MGWs) 130, 135 use open interfaces to connect to different types of nodes in the core network and external networks. A Media Gateway control interface (H.248) facilitates a separation of network control and connectivity layers. An A interface provides access to a GPRS Radio Access Network (GRAN) 120. An Iu interface provides access to a Universal Mobile Telecommunications System Terrestrial Radio Access Network (UTRAN) 125.

A voice call between the UTRAN 125 and a network 145 (which may be a Public Switched Telephone Network, an Integrated Service Digital Network, Public Land Mobile Network, Internet, Intranet, and the like) is interconnected by the two Media Gateways 130, 135. One of the Media Gateways 130 switches ATM or routes IP traffic and also provides interworking functions between ATM and IP. The MSC Server 110 and Gateway Mobile Switching Center server 115 (GMSC/TSC-server) control the other Media Gateway 135 via H.248 control paths. This Media Gateway 135 processes a media stream and provides interfaces to the Public Switched Telephone Network or other network 145.

In the connectivity layer 140 (which may be quality-of-service (QoS) enabled ATM or IP), a Gn interface between General Packet Radio Service Support Nodes handles packet-mode traffic between the Media Gateway 130 and the GGSN 150. The Media Gateways 130, 135 may facilitate QoS, for example, through a combination of ATM traffic management and multi-protocol label switching and differentiated services for IP.

During deployment of a layered network architecture, such as that illustrated in FIG. 1, difficulties arise when testing and verifying that the network and its various nodes, such as Media Gateways, are properly functioning. In order to determine whether the network architecture can handle real-world situations, testing must match expected usage patterns.

Ideally, for wireless networks deployed for mobile units, a test operator will simulate typical consumer usage by driving around diverse geographic locations covered by the wireless network and characterizing the service. However, with conventional techniques, test operators may not verify the integrity of a network without making a Media Gateway available to the general public and ongoing standard commercial traffic. This limitation means that if there are technical problems associated with a newly launched Media Gateway, such technical problems may also become apparent to the users of the system, which may result in customer dissatisfaction (e.g., due to poor speech quality and failed calls).

Accordingly, it will be appreciated that there remains a need to selectively bring a new Media Gateway or other network node into service so that it may be adequately tested and verified prior to becoming available to commercial traffic.

SUMMARY OF THE INVENTION

The invention may be embodied in a method for selectively providing access to a network node. Such a method may include the steps of associating the network node with a testing classification, receiving a request from a network component to initiate a call (for example, via the network node), determining whether the network component is associated with the testing classification, and providing service via the network node only if the network component is associated with the testing classification.

In some variations, the network node is a Media Gateway or other gateway component. In addition, the method may be conducted by a Mobile Switching Center or similar component.

The testing classification may be any sort of status indicator useful for determining whether to provide access to a certain network node. For example, the testing classification may indicate that the network node may be used on a limited basis for testing and verification of a network and other related purposes.

The method may also include the step of providing service via a different network node if the network component is not associated with the testing classification. This alternative network node may be a node that is available to general commercial traffic or a selected group of network components.

The testing classification may be designated or identified in several manners. The network node may set its testing classification and report such testing classification by sending a message (e.g., to a Mobile Switching Center). With this scenario, the method may further comprise the step of receiving a message from the network node identifying the testing classification. Such a message may be transmitted via a gateway control protocol and may comprise or be contained within a service change procedure message.

Alternatively, the testing classification may be set by a component external to the network node (e.g., a Mobile Switching Center), and in such arrangements, the method may further comprise the step of sending a message to the network node identifying the testing classification.

The testing classification may be based on factors such as groups of identifiable network components. In the case of mobile communications devices, the network components may be identified by international mobile subscriber identities associated therewith, dialing extensions (such as telephone number prefixes or suffixes) that can be used when initiating a call, types or classes of mobile communications devices, and the like.

The test classification may also be based on network components that have been locally flagged or otherwise as authorized for test traffic. Such designations may be by a Visitor Location Register or a Home Location Register. In another variation, the test classification may be based on specific command initiated test call procedures and measurements.

The invention may also be embodied in a computer program product, which may optionally be stored on a computer readable recording medium, comprising program code portions for performing the steps of one of the methods described herein when the computer program product is run on one or more computers or computer systems.

In another embodiment, a system is provided that comprises a computer processor and a memory coupled to the processor, wherein the memory is encoded with one or more programs that may perform a method for selectively providing access to a network node according to one of the methods described herein.

The invention may also be embodied in an apparatus to selectively providing access to a network node. Such an apparatus comprises an association unit to associate the network node with a testing classification, a reception unit to receive a request from a network component to initiate a call (for example, via the network node), a determination unit to determine whether the network component is associated with the testing classification, and a provision unit to provide service via the network node if the network component is associated with the testing classification.

BRIEF DESCRIPTION OF THE DRAWINGS

In the following the invention will be described with reference to exemplary embodiments illustrated in the figures, in which.

DETAILED DESCRIPTION OF THE PREFERRED EMBODIMENTS

In the following description, for purposes of explanation and not limitation, specific details are set forth, such as particular sequences of steps and various configurations, etc. in order to provide a thorough understanding of the present invention. It will be apparent to one skilled in the art that the present invention may be practiced in other embodiments that depart from these specific details. Moreover, those skilled in the art will appreciate that the functions explained herein below may be implemented using software functioning in conjunction with a programmed microprocessor or general purpose computer, and/or using an application specific integrated circuit (ASIC). It will also be appreciated that while the current invention is primarily described as a method, it may also be embodied in a computer program product as well as a system comprising a computer processor and a memory coupled to the processor, where the memory is encoded with one or more programs that may perform the methods disclosed herein.

Figure 2:
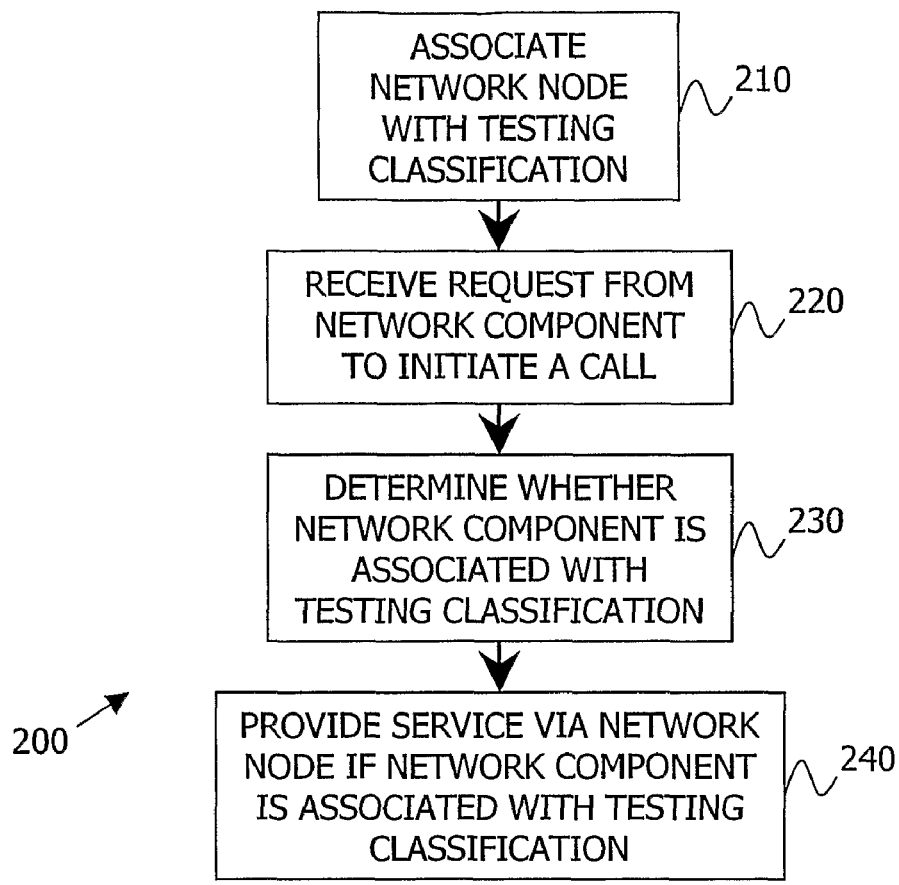
FIG. 2 is a process flow diagram of a method embodiment of the invention.

With reference to FIG. 2, a method embodiment of the current invention is illustrated. The method 200 is useful for selectively providing access to a network node and commences, at step 210, with associating the network node with a testing classification. Thereafter, at step 220, a request may be received from a network component to initiate a call (e.g., a test call via the network node). Once the request has been received, at step 230, it is determined whether the network component is associated with the testing classification. If the network component is associated with the testing classification, at step 240, service is provided via the network node if the network component is associated with the testing classification. Especially if there are two or more network nodes that are to be tested, a particular network node may be selected via conventionally used selection criteria such as nearest network node or it may be selected based on classes or types of network components (e.g., identifiable types or groups of mobile units that have been associated with individual network nodes via a look-up table or something similar) or based on any other mechanism.

Figure 3:
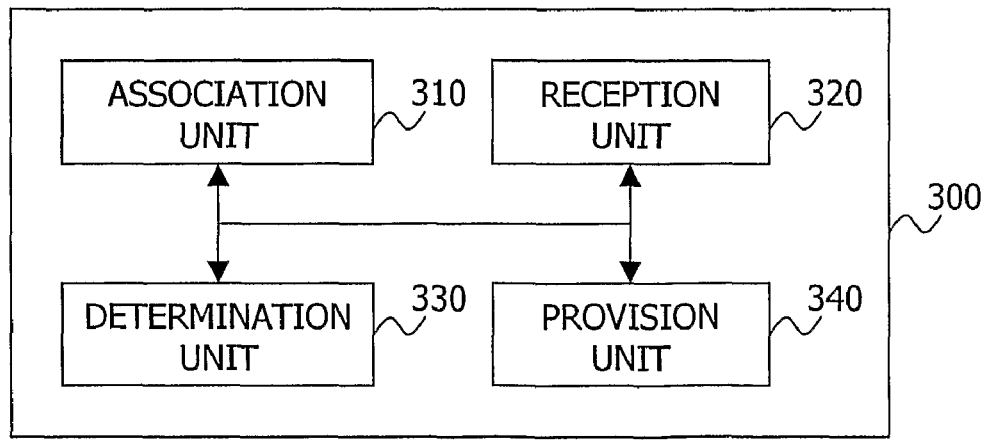
FIG. 3 is a second schematic diagram of an apparatus embodiment of the invention.

FIG. 3 provides an apparatus embodiment of the current invention that selectively provides access to a network node. The apparatus 300 includes an association unit 310 to associate the network node with a testing classification. A reception unit 320 receives a request from a network component to initiate a call (e.g., test call) via the network node. After such requests are received, a determination unit 330 determines whether the network component is associated with the testing classification. If the applicable network component is associated with the testing classification, then a provision unit 340 provides service via the network node.

The following provides examples of variations that may be optionally used in connection with the embodiments described herein, either alone or in combination where applicable. While the following may describe the network component as being a mobile communications device or mobile unit, it will be appreciated that the foregoing may be applicable to a wide variety of computer network components including wired terminals.

Figure 1:
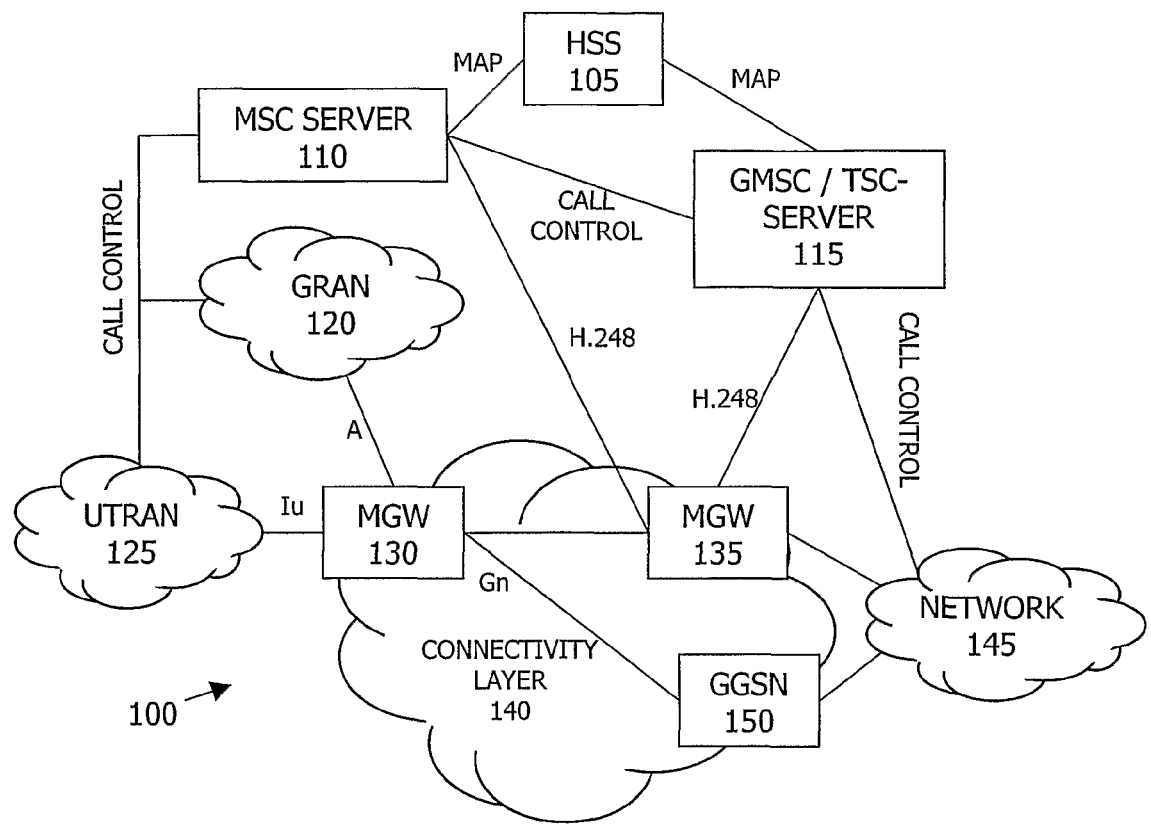
FIG. 1 is a first schematic diagram of a layered network architecture useful for understanding and implementing the invention.

In general, when a call setup is requested from a Mobile Switching Center server (such as the MSC 110 of FIG. 1), the testing classification of a Media Gateway is considered when a suitable path is being determined. If, for example, service has been requested by a network component via any or a particular network node that is to be tested and has a corresponding classification (e.g., one or both Media Gateways 130, 135 of FIG. 1), and such network component is not associated with the testing classification, service may be provided via a different network node, such as a network node available to commercial traffic (e.g., a verified and operational Media Gateway within the network). On the other hand, if service has been requested by a network component that is associated with the testing classification, then the test call will be routed via the applicable network node (such as one or both of Media Gateways 130, 135 in the above scenario).

The testing classification may be set in the network component. If the network component is a Media Gateway, a change in testing classification (or other status indicator) may be reported by the Media Gateway via gateway control protocol to the Mobile Switching Center server. Such a report may be accomplished via an ITU-T H.248 service change procedure message in which the Media Gateway registers its availability with a Media Gateway Controller. Alternatively, the testing classification may be set in the Mobile Switching Center—which may also include the Mobile Switching Center sending a message or other notification to the network node indicating the testing classification.

The testing classification may be based on any criteria that can exclude or otherwise selectively designate certain network components, or groups of network components. For example, serial numbers (e.g., IMSI, MSISDN, etc.), phone numbers associated with the network components, or telephone number extensions (usually non-routable prefixes) that are used by a network component such as a mobile terminal when initiating a call may be used. Alternatively, the testing classification association may be based on an indicator (e.g., a flag) in the Visitor Location Register which contains all subscriber data required for call handling and mobility management for network components controlled thereby. In yet another alternative, the testing classification may be based on an indicator (e.g., a flag) in the Home Location Register which provides a database within the Home Public Land Mobile Network and provides routing information for various calls and messages as well as the maintenance of subscriber (network component) information.

The network node may, in some variations, be a gateway that supports both bearer traffic and signalling traffic such as a Media Gateway. A Media Gateway, for example, may be associated with a testing classification, either in the Media Gateway and reported via Gateway Control Protocol (GCP—Mc interface such as via the service change procedure of ITU-H.248) to the Mobile Switching Center server, or it may be set in the Mobile Switching Center server (without impacting the GCP). In either event, a Media Gateway that has been associated with a testing classification will only be available for access by specifically identified network components (e.g., mobile communications devices).

To effect the selective access, a Mobile Switching Center server shall only select the Media Gateway for certain traffic cases (such as those used for network verification purposes). For example, the network may be tested via (i) calls from a mobile communications device that belongs to a certain set of International Mobile Subscriber Identities (or other identifier); and/or (ii) calls from subscribers that are flagged (locally or otherwise identified) as authorized for test traffic (e.g., by Visitor Location Register (VLR) or by Home Location Register (HLR) settings); and/or (iii) specific command initiated test call procedures and measurements.

With the current arrangement, when a call setup is requested from the Mobile Switching Center server, the Media Gateway traffic classification (or status) shall be considered when selecting a suitable Media Gateway. Therefore, traffic cases and users (network components) that are not authorized to select the Media Gateway having a traffic classification (i.e., the commercial traffic), will continue using the verified and operational Media Gateways in the network available to the other customers, whereas authorized users and/or special traffic cases will be able to use the Media Gateways having the traffic classification.

It will be appreciated by the skilled artisan that the techniques described herein provide a significant improvement over the conventional art in that newly installed equipment may be fully verified by simulating ongoing commercial traffic prior to being made available to customers within the general public. This pre-launch testing ensures that revenue losses do not occur as a result of dropped calls and through customer dissatisfaction with poor speech quality. Furthermore, the current invention reduces the amount of operation and maintenance work associated with a Media Gateway in that the only the status of a Media Gateway need be manipulated to make it available to commercial traffic, or alternatively, to take a Media Gateway offline for further testing.

It will also be appreciated by the person of ordinary skill in the art that while the invention was described in connection with a testing classification indicative of whether the network node may be used for testing and verification of a network, the invention may be utilized in any other scenario in which it is desirable to provide selective access to a network node. Such scenarios include intelligent network (IN) calls, IP multimedia services such as push-to-talk, the selection of specific transcoders, and the like.

While the present invention has been described with respect to particular embodiments, those skilled in the art will recognize that the present invention is not limited to the specific embodiments described and illustrated herein. Therefore, while the present invention has been described in relation to its preferred embodiments, it is to be understood that this disclosure is only illustrative. Accordingly, it is intended that the invention be limited only by the scope of the claims appended hereto.

The invention claimed is:

1. A method for selectively providing access to a network node the method comprising the steps of:
    associating the network node with a testing classification;
    receiving a request from a network component to initiate a call;
    determining whether the network component is associated with the testing classification wherein the testing classification indicates that the network node is restrictively used for testing and verification purposes; and
    providing service via the network node only if the network component is associated with the testing classification.

2. The method of claim 1, wherein the network node is a Media Gateway.

3. The method of claim 1, further comprising the step of: providing service via a different network node if the network component is not associated with the testing classification.

4. The method of claim 1, further comprising the step of: receiving a message from the network node identifying the testing classification.

5. The method of claim 4, wherein the message is transmitted via a gateway control protocol.

6. The method of claim 4, wherein the message is a service change procedure message.

7. The method of claim 1, further comprising the step of: sending a message to the network node identifying the testing classification.

8. The method of claim 1, wherein the testing classification is based on identifiable network components.

9. The method of claim 8, wherein the network components are identified based on an international mobile subscriber identity associated therewith.

10. The method of claim 8, wherein the network components are identified based on a dialing extension.

11. The method of claim 1, wherein the testing classification is assigned to identified network components within a visitor location register.

12. The method of claim 1, wherein the testing classification is assigned to identified network components within a home location register.

13. The method of claim 1, wherein the steps are carried out by a Mobile Switching Center.

14. The method of claim 1, wherein the network component is a mobile communications device.

15. A system for selectively providing access to a network node, the system comprising:
    means for associating the network node with a testing classification;
    means for receiving a request from a network component to initiate a call;
    means for determining whether the network component is associated with the testing classification wherein the testing classification indicates that the network node is restrictively used for testing and verification purposes; and
    means for providing service via the network node only if the network component is associated with the testing classification.

16. An apparatus to selectively providing access to a network node, the apparatus comprising:
    an association unit to associate the network node with a testing classification;
    a reception unit to receive a request from a network component to initiate a call;
    a determination unit to determine whether the network component is associated with the testing classification wherein the testing classification indicates that the network node is restrictively used for testing and verification purposes; and a provision unit to provide service via the network node if the network component is associated with the testing classification.

17. The system of claim 16, wherein the network node is a Media Gateway.

18. The system of claim 15, further comprising means for providing service via a different network node if the network component is not associated with the testing classification.

19. The system of claim 15, further comprising means for receiving a message from the network node identifying the testing classification.

20. The system of claim 19, wherein the message is transmitted via a gateway control protocol.

21. The system of claim 19, wherein the message is a service change procedure message.

22. The system of claim 15, further comprising means for sending a message to the network node identifying the testing classification.

23. The system of claim 15, wherein the testing classification is based on identifiable network components.

24. The system of claim 23, wherein the network components are identified based on an international mobile subscriber identity associated therewith.

25. The system of claim 23, wherein the network components are identified based on a dialing extension.

26. The system of claim 15, wherein the testing classification is assigned to identified network components within a visitor location register.

27. The system of claim 15, wherein the testing classification is assigned to identified network components within a home location register.

28. The system of claim 15, wherein the steps are carried out by a Mobile Switching Center.

29. The system of claim 15, wherein the network component is a mobile communications device.

* * * * *

UNITED STATES PATENT AND TRADEMARK OFFICE
CERTIFICATE OF CORRECTION

PATENT NO. : 8,089,885 B2  Page 1 of 1
APPLICATION NO. : 11/575124
DATED : January 3, 2012
INVENTOR(S) : Turina It is certified that error appears in the above-identified patent and that said Letters Patent is hereby corrected as shown below:

On the Title Page, Item (57), under "ABSTRACT", Line 2,
delete "verification associated" and insert -- verification purposes. The network node is associated --, therefor.

On the Title Page, Item (57), under "ABSTRACT", Line 5,
delete "that with" and insert -- that the network component is associated with --, therefor.

In Column 7, Line 7, in Claim 17, delete "16," and insert -- 15, --, therefor.

Signed and Sealed this
Twenty-seventh Day of March, 2012

David J. Kappos
*Director of the United States Patent and Trademark Office*